Patented Mar. 10, 1925.

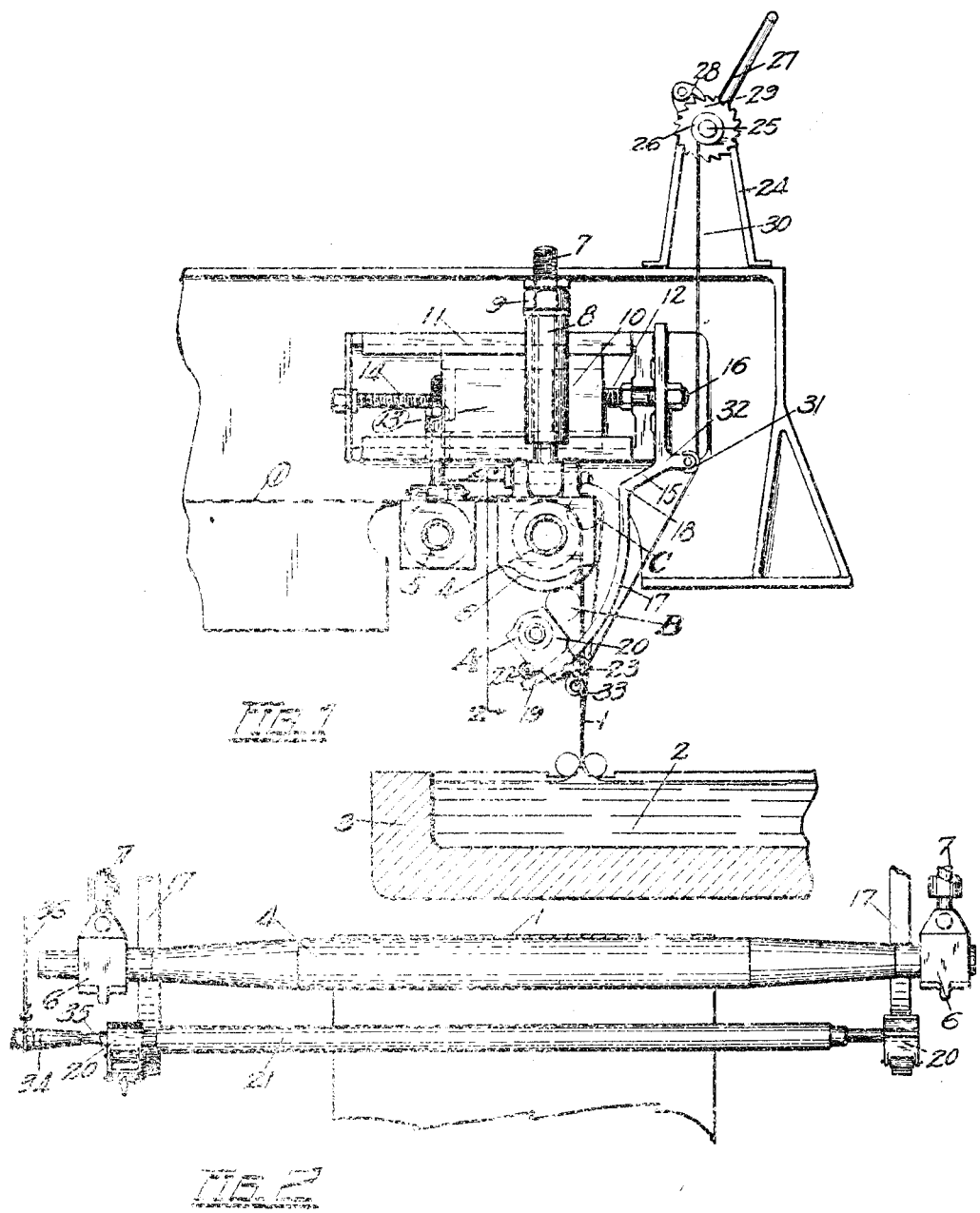

1,529,268

UNITED STATES PATENT OFFICE.

JOSEPH M. NEENAN, OF SHREVEPORT, LOUISIANA, ASSIGNOR TO THE LIBBEY-OWENS SHEET GLASS COMPANY, OF TOLEDO, OHIO, A CORPORATION OF OHIO.

CHANGING BENDING ROLLS IN SHEET-GLASS-DRAWING MACHINES.

Application filed February 23, 1924. Serial No. 694,524.

*To all whom it may concern:*

Be it known that I, JOSEPH M. NEENAN, a citizen of the United States, residing at Shreveport, in the parish of Caddo and State of Louisiana, have invented new and useful Improvements in Changing Bending Rolls in Sheet-Glass-Drawing Machines, of which the following is a specification.

This invention relates to an improved method and apparatus for changing bending rolls in a sheet glass drawing machine.

In a sheet glass drawing mechanism of the type disclosed in the patent to Colburn, 1,248,809, granted December 4, 1917, the flat sheet of glass is continuously drawn upward for a short distance from a pool of molten glass, and then the still plastic sheet is bent into the horizontal plane over a cooled metallic bending roller. This roller must necessarily have a very smooth and perfect finish, in order not to mar the fine fire-polished surface of the glass sheet as it passes thereover. Occasionally, and at irregular intervals of time, these rollers become dirty or tarnished or other imperfections develop, in which event the roller must be removed to be cleaned or polished, and a new roller must be substituted therefor in the machine. To accomplish this by ordinary methods, the machine must be stopped, and the sheet discontinued. The pool of molten glass is covered over to keep the glass at the proper working temperature, and after the old roll has been removed and a new one put in its place, the drawing of the sheet must again be started by placing a bait within the molten glass and drawing a new sheet upwardly over the roller and through the drawing machine. A considerable length of sheet must be drawn before it again reaches the quality that was being obtained before the machine was stopped. All of this results in a considerable loss of time and production.

The object of the present invention is to provide a simple method and apparatus whereby a new roller may be substituted for the old one without halting the sheet drawing process. In this way most of the loss of time and glass will be avoided.

The invention will be more clearly understood from the following detailed description of one approved form of the apparatus.

In the accompanying drawings:

Fig. 1 is a side elevation, partially in vertical longitudinal section, of that portion of the sheet-drawing mechanism concerned with this invention.

Fig. 2 is a transverse vertical section through a portion of the apparatus, the view being taken substantially on the line 2—2 of Fig. 1.

The glass sheet 1 is drawn upwardly from the pool of molten glass 2 in the pot or receptacle 3, and then while still somewhat plastic is bent about the cooled bending roller 4 into the horizontal plane. The sheet is then carried along over an intermediate supporting roll 5 onto a drawing and supporting mechanism (not shown) and thence into the leer. The bending roll 4 is mounted on suitable roller bearings in bearing-boxes 6 at the sides of the machine, the boxes 6 being hung from the supporting rods or bolts 7 vertically adjustable through supporting sleeves 8 by means of adjusting nuts 9, whereby the bending roll may be moved up or down as desired. Supporting sleeve 8 is carried on a slide 10 adjustable horizontally in the trackways 11 of the side frame, by means of the adjusting bolt 12. In this way the position of the bending roll may be adjusted horizontally. By an exactly similar mechanism the intermediate idler supporting roll 5 may be adjusted vertically and horizontally, this roller being carried by the slide 13, adjustable horizontally by bolt 14. All of the above is substantially as disclosed in the Colburn patent referred to hereinabove.

When it is desired to make a change of bending rollers, the following additional apparatus is placed upon the machine. At each side of the machine a supporting guide-bar 15 is clamped to the side frame by means of bolt 16, as shown in Fig. 1. This guide bar comprises a downwardly projecting curved member 17 reaching from a point 18 outside and somewhat above the angle made by the glass sheet about the bending roller, to a point 19 below the bending roller and within the angle of the glass sheet. A pair of bearing-boxes 20 for supporting the ends of a smaller auxiliary sheet-supporting roll 21, are adapted to be slidably mounted on the curved guide-rods 17. As shown, each bearing box 20 has rollers 22 and 23 bearing on the upper and lower surfaces of the guide-rod respectively, whereby the boxes may be easily moved up or down along these guides.

The auxiliary roll 21, which is preferably considerably smaller than the main bending roll 4, may be provided with a polished sheet-supporting surface, although it is not essential that this roll surface be as perfect as those of the rolls 4 and 5, since the roll 21 is only used for a short time while the changing operation is taking place, and the glass drawn thereover will ordinarily be discarded.

A windlass mechanism 24 is provided to simultaneously move the bearing-boxes 20 up and down the guides. This windlass comprises a horizontal cross-shaft 25 carrying a cable drum 26 at either end. Shaft 25 is adapted to be rotated by a suitable crank 27 at one end and the reverse movement of the shaft is controlled by the pawl 28 engaging ratchet 29. At each side of the machine a cable 30 passes down around deflecting roller 31 carried by the projecting arm 32 of guide-bar 15, and the lower end of the cable is adapted to be hooked onto the eye 33 projecting from the lower side of bearing-box 20. By suitably turning the crank 27 the bearing-boxes 20 at the two sides of the machine may be simultaneously drawn up along the guides 17, carrying with them the horizontal auxiliary roller 21. The roller may be held in place at any desired elevation or position by the pawl and ratchet 28 and 29, and when it is desired to lower the auxiliary roller, pawl 28 will be removed from the ratchet and the roller lowered by a reverse movement of crank 27.

When it becomes necessary to change the bending roller in one of these sheet-drawing machines, the new bending roller 4 and the auxiliary roll 21 will first be heated (in any suitable manner) to a temperature such that they may be placed in the machine without unduly chilling the glass sheet. The guides 15 are then bolted in place at the sides of the machine, and the windlass mechanism 24 is clamped in position on top of the machine. The bearing-boxes 20 are then placed on the ends of the auxiliary roll 21, which is still outside of the machine, and the roll is lifted and supported by a long rod or tool 34 having a reduced end 35 which may be inserted in one end of the hollow roll 21. Only one end of this tool 34 is shown in Fig. 2. The tool 34 is suspended from an overhead crane by the cable or chain 36, and then the auxiliary roll 21 is pushed into position below the bending roll 4, and the boxes 20 are fastened in place upon the guides 17. If desired, the procedure just outlined may be changed by first securing the bearing-box 20, on the far side of the machine, in place on the guide 17, and then slipping the end of roll 21 into this bearing when the roll is placed under the bending roll 4 as just described. After the bearing-boxes 20 have been positioned upon the guides 17 the lower ends of the cables 30 are hooked to the eyes 33 so as to support the auxiliary roll in this initial position, which is that shown in full lines in Fig. 1 of the drawings, and indicated by the letter A.

The crank 27 is now rotated until the roller 21 is drawn up to the position B (indicated in dotted lines) where this roller is just brought into contact with the normal vertical run of the glass sheet 1. The idler roll 5 and bending roll 4 are now moved over to the left, Fig. 1, by suitably manipulating the bolts 14 and 12. Auxiliary roll 21 is now drawn up to the position C, in which position the glass sheet 1 is entirely supported at the bending point by this auxiliary roller and bending roll 4 is out of contact with the sheet. The old bending roll 4 may be removed and the new one inserted in its place. While this change is being made the glass sheet 1 is continuously being drawn over the auxiliary roll 21.

After the change has been made, auxiliary roll 21 is first lowered to the position B, and then rolls 4 and 5 are moved to the right to their normal positions. Auxiliary roll 21 is then completely lowered to its initial position A, after which the auxiliary roll 21 and its supporting and adjusting members are removed by a reversal of the steps first described.

This complete operation takes but a very short time and the glass sheet is supported for an even shorter time upon the auxiliary roll 21. The comparatively short strip of glass which is distributed by these operations and which passes over the roll 21 will usually be of inferior quality, and will be discarded. However, this possible loss is very slight compared with the large amount of production that is lost by the old method of roll changing whereby the sheet-drawing operation must cease entirely for a considerable time.

Claims:

1. In the process of drawing a continuous sheet of glass from a pool of molten glass and then bending the plastic sheet about a bending roller into another plane, the method of changing bending rollers without halting the drawing operation, consisting in positioning an auxiliary roller within the angle made by the sheet but out of contact with the sheet, then moving the auxiliary roller into the angle of the sheet so as to support the sheet and lift same from the bending roller, removing and replacing the bending roller, and then moving the auxiliary roller out of the sheet angle so that the sheet will be supported by the new bending roller.

2. In the process of drawing a continuous sheet of glass from a pool of molten glass and then bending the plastic sheet about a bending roller into another plane, the method of changing bending rollers without halting the drawing operation, consisting in positioning an auxiliary roller within the angle made by the sheet but out of contact with the sheet, then moving the auxiliary roller into the angle of the sheet so as to support the sheet and lift same from the bending roller, removing and replacing the bending roller, and then moving the auxiliary roller out of the sheet angle so that the sheet will be supported by the new bending roller, the auxiliary roller remaining at all times out of contact with either of the bending rollers.

3. An apparatus for changing bending rollers in a machine for drawing a continuous sheet of glass and deflecting the plastic sheet about a bending roller, comprising an auxiliary sheet-supporting roller, and means for positioning the auxiliary roller within the angle of the glass sheet so as to support the sheet out of contact with the bending roller.

4. An apparatus for changing bending rollers in a machine for drawing a continuous sheet of glass and deflecting the plastic sheet about a bending roller, comprising an auxiliary sheet-supporting roller, and a pair of guides along which the auxiliary roller is moved from inactive position to a position where it supports the glass sheet out of contact with the bending roller.

5. An apparatus for changing bending rollers in a machine for drawing a continuous sheet of glass and deflecting the plastic sheet about a bending roller, comprising an auxiliary sheet-supporting roller, a pair of guides along which the auxiliary roller is moved from inactive position to a position where it supports the glass sheet out of contact with the bending roller, and means for moving the roller along the guides.

6. An apparatus for changing bending rollers in a machine for drawing a continuous sheet of glass and deflecting the plastic sheet about a bending roller, comprising an auxiliary sheet-supporting roller, a pair of guides, one at either side of the machine, a bearing for an end of the auxiliary roller movable along each guide, and means for simultaneously moving the bearings so that the auxiliary roller may be moved into or out of sheet-supporting position.

7. An apparatus for changing bending rollers in a machine for drawing a continuous sheet of glass and deflecting the plastic sheet about a bending roller, comprising an auxiliary sheet-supporting roller, a pair of guides, one at either side of the machine, each guide extending from a point above and outside of the bending angle of the sheet to a point below and inside of this angle, a bearing for an end of the auxiliary roller movable along each guide, and means for simultaneously moving the bearings so that the auxiliary roller is carried from a position within the sheet angle and out of contact with the sheet, to a sheet-supporting position, the sheet being simultaneously lifted from the bending roller.

Signed at Shreveport, in the parish of Caddo, and State of Louisiana, this 16th day of February, 1924.

JOSEPH M. NEENAN.